(12) United States Patent
Sakata

(10) Patent No.: US 10,410,574 B2
(45) Date of Patent: Sep. 10, 2019

(54) DISPLAY DEVICE, DISPLAY METHOD, AND RECORDING MEDIUM STORING PROGRAM

(71) Applicant: OLYMPUS CORPORATION, Hachioji-shi, Tokyo (JP)

(72) Inventor: Seiichiro Sakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/640,953

(22) Filed: Jul. 3, 2017

(65) Prior Publication Data

US 2018/0012539 A1  Jan. 11, 2018

(30) Foreign Application Priority Data

Jul. 7, 2016 (JP) .................. 2016-135131

(51) Int. Cl.
*G09G 3/20* (2006.01)
*G09G 5/30* (2006.01)
*H04N 1/60* (2006.01)
*H04N 9/77* (2006.01)
*G02B 27/01* (2006.01)
*G06T 11/00* (2006.01)

(52) U.S. Cl.
CPC ....... *G09G 3/2096* (2013.01); *G02B 27/0172* (2013.01); *G09G 5/30* (2013.01); *G02B 2027/014* (2013.01); *G02B 2027/0178* (2013.01); *G09G 2310/08* (2013.01); *G09G 2320/066* (2013.01); *G09G 2320/0613* (2013.01); *G09G 2320/0626* (2013.01); *G09G 2320/0666* (2013.01); *G09G 2340/0464* (2013.01)

(58) Field of Classification Search
CPC combination set(s) only.
See application file for complete search history.

(56) References Cited

U.S. PATENT DOCUMENTS

| 5,970,264 | A | * | 10/1999 | Funaki | ........ G03B 17/18 396/284 |
| 9,767,735 | B2 | * | 9/2017 | Mizukami | ........ H04W 52/027 |
| 2007/0132663 | A1 | | 7/2007 | Iba | |
| 2012/0249572 | A1 | * | 10/2012 | Yoshimura | ........ H04N 21/4312 345/592 |
| 2014/0092146 | A1 | * | 4/2014 | Hitaka | ........ G09G 5/10 345/690 |
| 2014/0282159 | A1 | * | 9/2014 | Lee | ........ G06F 3/0481 715/768 |
| 2017/0061924 | A1 | * | 3/2017 | Lee | ........ G09G 5/02 |

(Continued)

FOREIGN PATENT DOCUMENTS

| CN | 103902156 A | * | 7/2014 | ........ G06F 3/0481 |
| JP | 2007-163634 | | 6/2007 | |

*Primary Examiner* — Wesner Sajous
(74) *Attorney, Agent, or Firm* — John C. Pokotylo; Pokotylo Patent Services

(57) ABSTRACT

A display device includes: a determination unit that determines, on the basis of display information, a period of time during which a display unit displays the display information with a first display characteristic; and a controller that controls the display unit to display the display information with the first display characteristic and to display the display information with a second display characteristic when the period of time has elapsed since the display with the first display characteristic was started.

17 Claims, 10 Drawing Sheets

(56) References Cited

U.S. PATENT DOCUMENTS

2017/0228033 A1\* 8/2017 Takimoto ................ G06F 3/017
2018/0098048 A1\* 4/2018 Kura ...................... H04N 13/30
2018/0234661 A1\* 8/2018 Tsukahara ............. G06F 3/0487

\* cited by examiner

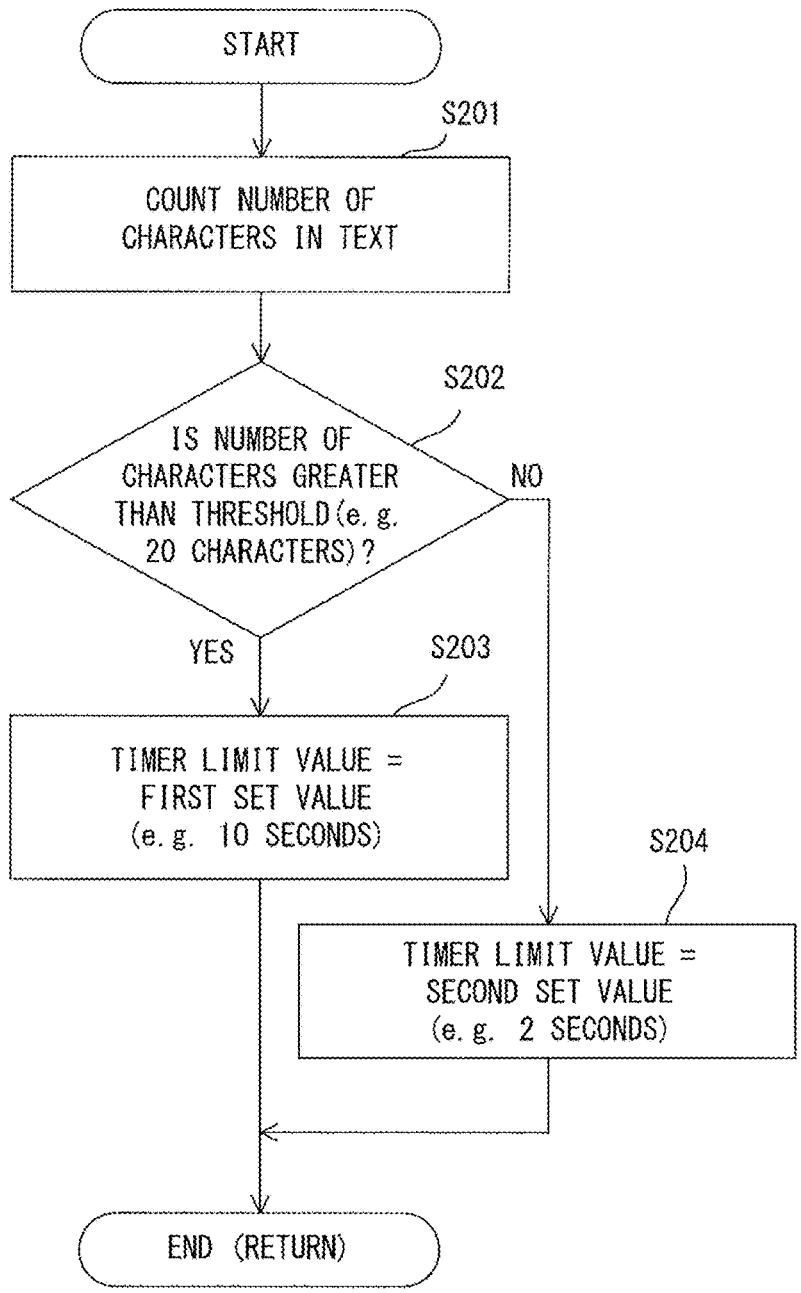
F I G. 4

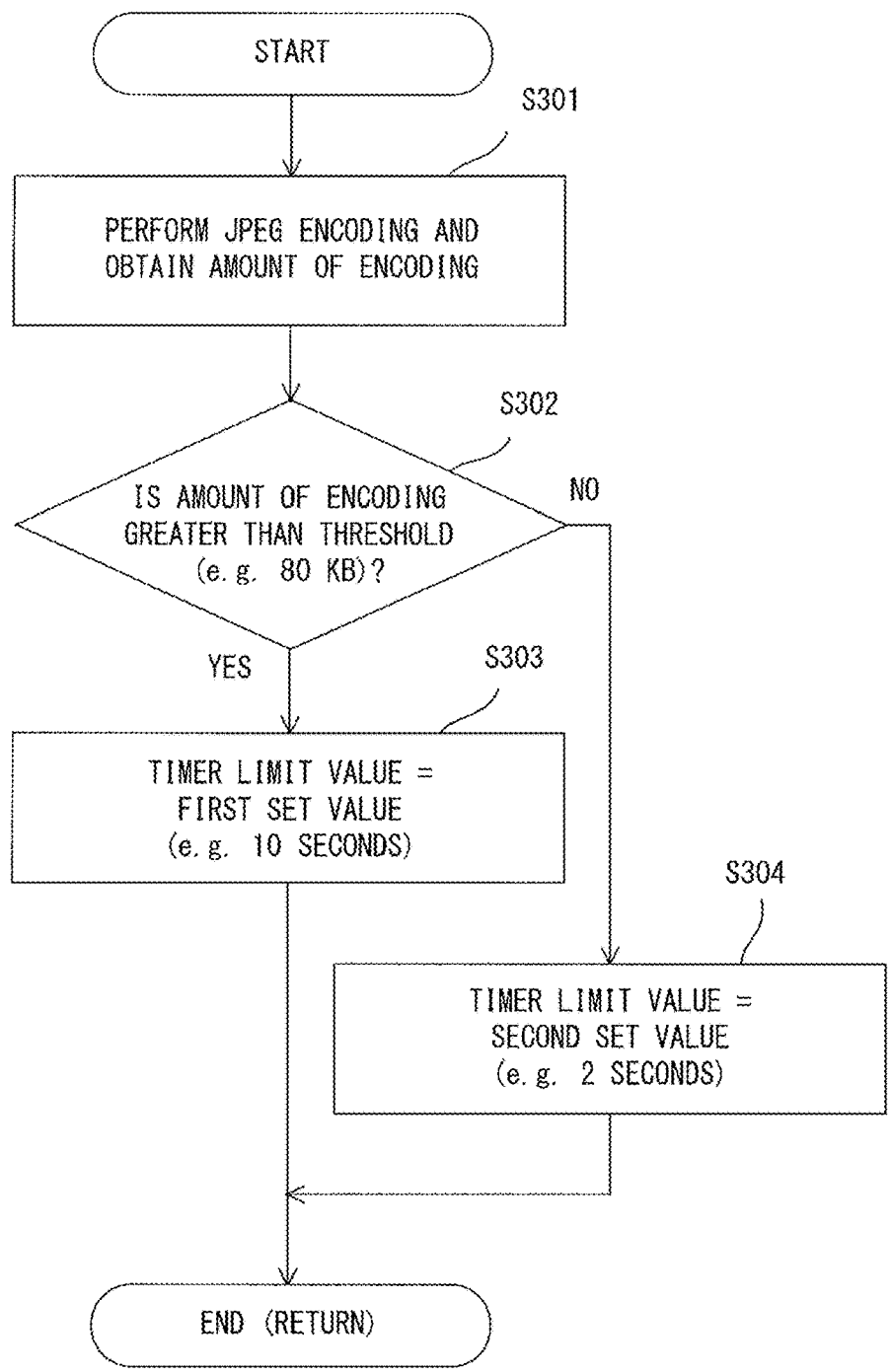
F I G. 5

DISPLAY DEVICE, DISPLAY METHOD, AND RECORDING MEDIUM STORING PROGRAM

CROSS-REFERENCE TO RELATED APPLICATIONS

This application is based upon and claims the benefit of priority of the prior Japanese Patent Application No. 2016-135131, filed Jul. 7, 2016, the entire contents of which are incorporated herein by reference.

FIELD

The present invention relates to a display device that displays information such as characters or an image, a display method of the display device, and a recording medium storing a program executed in the display device.

BACKGROUND

Conventionally, a head-mounted display device is known as a form of a display device that displays information such as characters or an image.

The head-mounted display device can be roughly classified into an eyeglass style, a goggle style, a cap style, and the like, according to the form. Further, the head-mounted display device can also be roughly classified into a see-through type or a non-see-through type according to whether a user can see the outside world together with display information in his/her field of view, which is realized with the see-through one and not realized with the non-see-through one.

With respect to the see-through type head-mounted display device, various proposals have been made in terms of an improved usability for a user. For example, an information display device has been proposed in which a display mode of display information is switched according to the behavior of the user (see Patent Document 1 (Japanese Laid-open Patent Publication No. 2007-163634)). In this information display device, the display mode is switched between a brief display mode and a detailed display mode according to the behavior of the user, such as whether the user is walking, or whether the user is looking at display information, or whether the user is talking, so as to perform an information display suitable for the behavior of the user.

SUMMARY

An aspect of the present invention provides a display device that includes: a display unit that displays input display information; a determination unit that determines, on the basis of the display information, a period of time during which the display unit displays the display information with a first display characteristic; and a controller that controls the display unit to display the display information with the first display characteristic and to display the display information with a second display characteristic when the period of time has elapsed since the display with the first display characteristic was started.

Another aspect of the present invention provides a display method of a display device, the display method including: displaying input display information with a first display characteristic; determining, on the basis of the display information, a period of time during which the display information is displayed with the first display characteristic; and displaying the display information with a second display characteristic when the period of time has elapsed since the display information started being displayed with the first display characteristic.

Yet another aspect of the present invention provides a non-transitory computer-readable recording medium storing a program for causing a computer of a display device to perform a process including: displaying input display information with a first display characteristic; determining, on the basis of the display information, a period of time during which the display information is displayed with the first display characteristic; and displaying the display information with a second display characteristic when the period of time has elapsed since the display information started being displayed with the first display characteristic.

BRIEF DESCRIPTION OF DRAWINGS

FIG. 4 is a flowchart that illustrates an example of timer limit value determination processing (S103) performed when display information represented by display data is text (characters);

FIG. 5 is a flowchart that illustrates an example of the timer limit value determination processing (S103) performed when the display information represented by the display data is an image;

DESCRIPTION OF EMBODIMENTS

Embodiments of the present invention will now be described with reference to the drawings.

Figure 1:
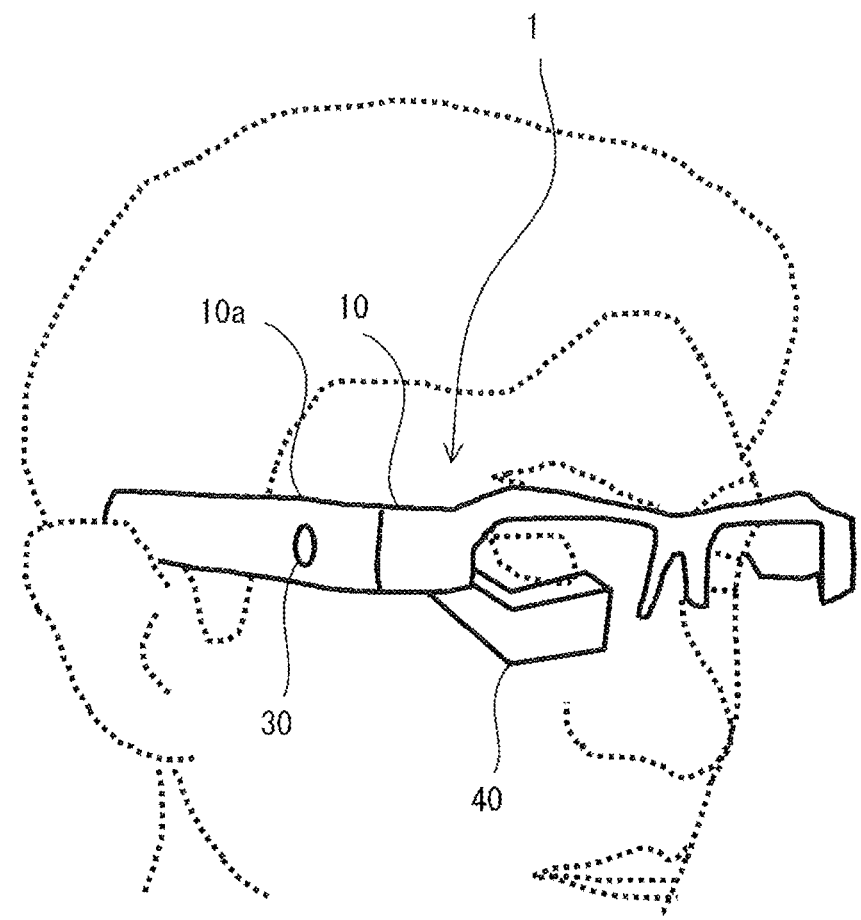
FIG. 1 is a perspective external view of a display device according to an embodiment.

FIG. 1 is a perspective external view of a display device according to an embodiment of the present invention.

As illustrated in FIG. 1, a display device 1 is a head-mounted display device. Specifically, the display device 1 is an eyeglass-style head-mounted display device having a shape of eyeglasses, and is a see-through type head-mounted display device with which a user who is using the display device 1 can see the outside world together with display information in his/her field of view.

In FIG. 1, the display device 1 includes an eyeglass portion 10, a display unit 20 (not illustrated in FIG. 1) that is provided inside the eyeglass portion 10 (for example, inside an arm portion (a bow portion) 10a of the eyeglass portion 10), a manipulation button 30 provided on the side of the arm portion 10a, and a display optical system 40.

The manipulation button 30 is a button that is used when a user issues a predetermined instruction (such as an instruction to power on or power off the display device 1) to the display device 1.

The display optical system 40 is a light-guiding optical system that optically guides display information such as characters or an image to the front of the eyes of the user, and has a configuration similar to, for example, the configuration of the display optical system disclosed in Patent Document 1, the display information being displayed on a display 207 that is provided in the display unit 20 and will be described later. The configuration of the display optical system 40 is not limited to this, but any configuration is acceptable as long as a see-through type display device can be realized as the display device 1.

Figure 2:
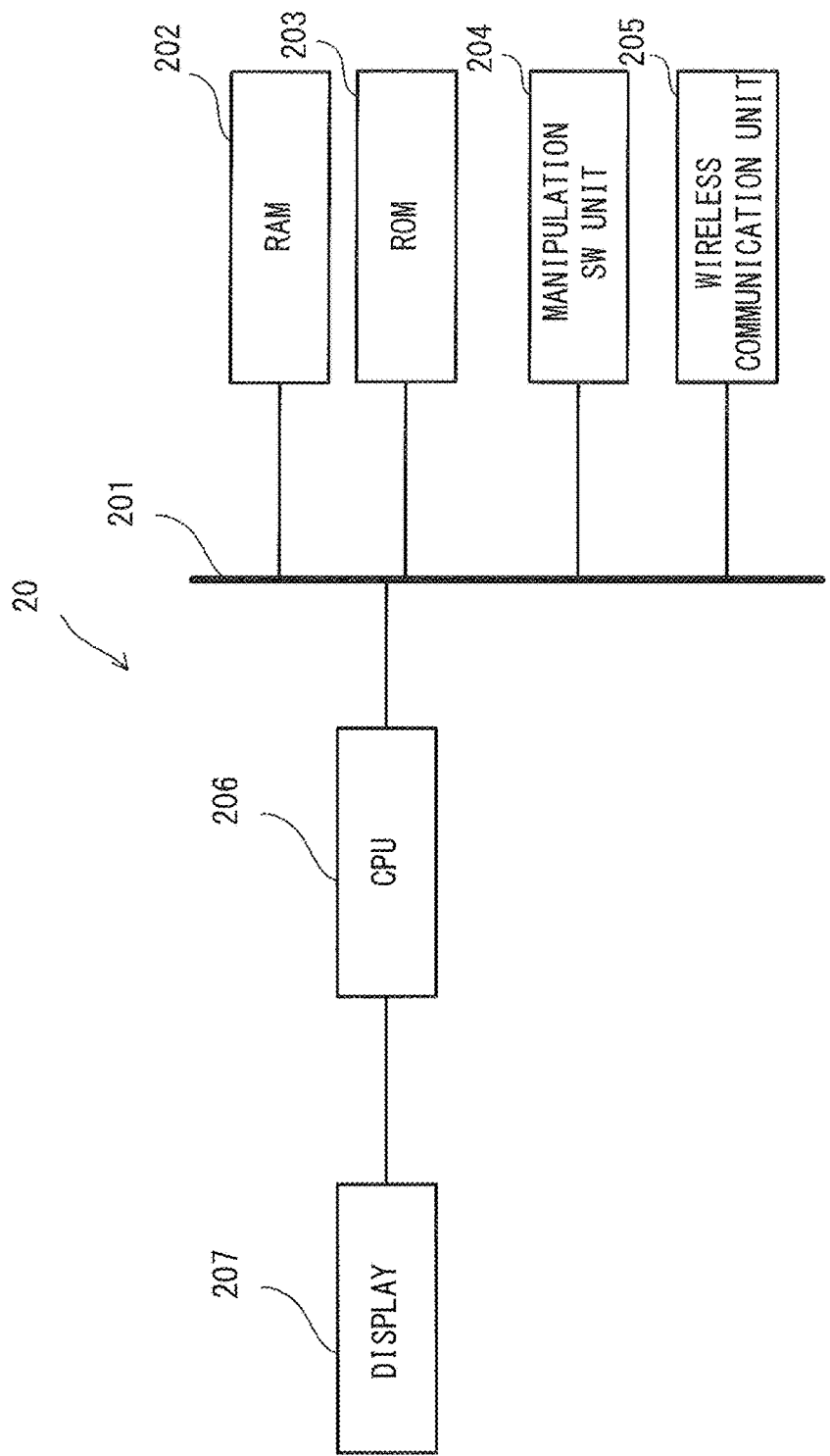
FIG. 2 illustrates an example of a configuration of a display unit provided inside an eyeglass portion.

FIG. 2 illustrates an example of a configuration of the display unit 20 provided inside the eyeglass portion 10.

As illustrated in FIG. 2, the display unit 20 includes a bus 201, a RAM (random access memory) 202, a ROM (read only memory) 203, a manipulation SW (switch) unit 204, a wireless communication unit 205, a CPU (central processing unit) 206, and the display 207, wherein the RAM 202, the ROM 203, the manipulation SW unit 204, the wireless communication unit 205, and the CPU 206 are connected to the bus 201 and the display 207 is connected to the CPU 206.

The bus 201 is a transmission line for data that is transmitted and received between the RAM 202, the ROM 203, the manipulation SW unit 204, the wireless communication unit 205 and the CPU 206 that are connected to the bus 201.

The RAM 202 is a memory used as, for example, a working area, and, for example, display data that represents display information such as characters or an image that is displayed on the display 207 is temporarily stored in the RAM 202. The display data stored in the RAM 202 is input, for example, from the outside through the wireless communication unit 205.

A program executed by the CPU 206, data used during an execution of the program, and the like are stored in the ROM 203.

The manipulation SW unit 204 includes a manipulation SW that works in conjunction with the manipulation button 30, and, for example, reports, to the CPU 206, an electric signal corresponding to a state of the manipulation button 30 (a state of the manipulation SW working in conjunction with the manipulation button 30).

The wireless communication unit 205 performs a wireless communication with an external device under the control of the CPU 206. For example, the wireless communication unit 205 performs a wireless communication with an external device such as a Smartphone® or a tablet using, for example, Bluetooth®, and receives, for example, display data from the external device. The received display data is then stored in the RAM 202.

The CPU 206 controls an operation of the display device 1 (the display unit 20) by executing a program stored in the ROM 203. For example, the CPU 206 controls a display operation described later with reference to FIG. 3.

The display 207 is a display panel such as a transmissive or reflective liquid crystal display element, a self-luminous organic EL (electro luminescence) element, or an inorganic EL element. Under the control of the CPU 206, the display 207 displays display information such as characters or an image that is represented by display data stored in the RAM 202, using the specific display characteristics. The display characteristics include one or more characteristics that are, for example, a display brightness, a display color, a display contrast, and a display position.

The display unit 20 is also provided with a battery, and power is supplied to each component of the display unit 20 from the battery, although this is not illustrated.

In the display device 1 having the configuration described above, the display 207 is an example of a display unit that displays input display information. A portion of the functions of the CPU 206 are an example of a determination unit that determines, on the basis of the display information, a period of time during which the display unit displays the display information with a first display characteristic. Another portion of the functions of the CPU 206 are an example of a controller that controls the display unit to display the display information with the first display characteristic and to display the display information with a second display characteristic when the period of time described above has elapsed since the display with the first display characteristic was started.

Figure 3:
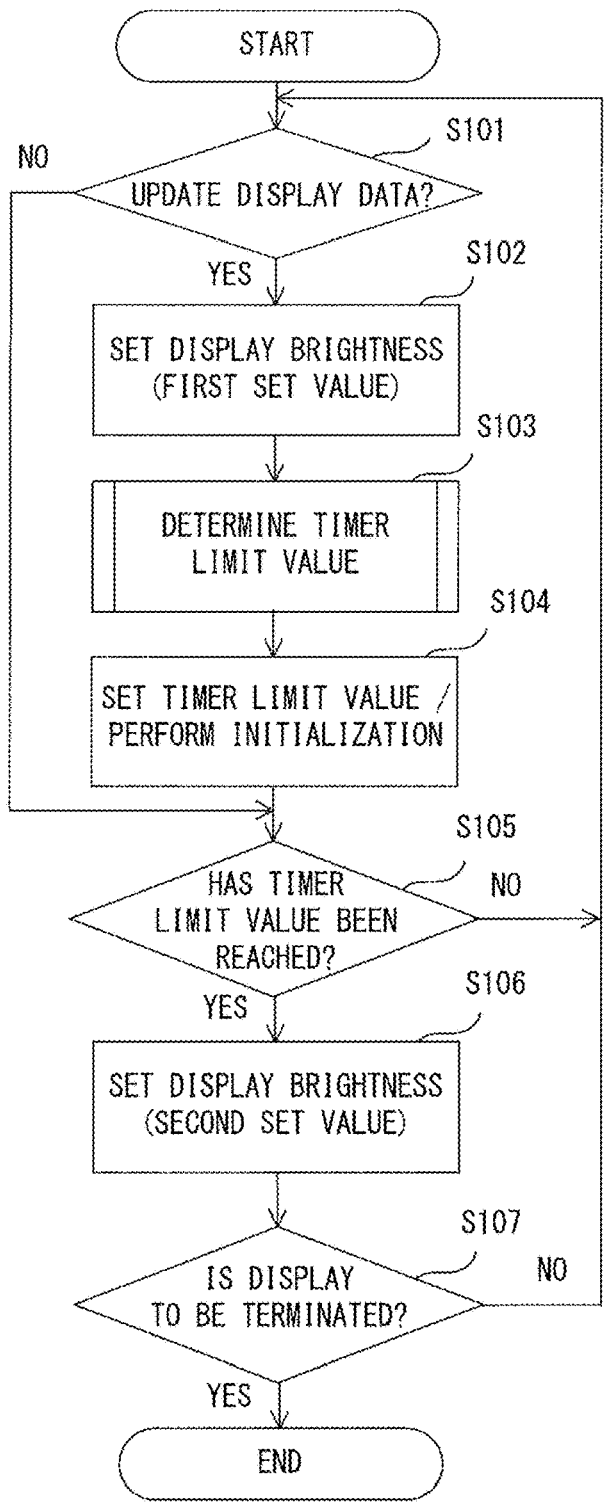
FIG. 3 is a flowchart that illustrates an example of a display operation performed by the display device according to an embodiment.

FIG. 3 is a flowchart that illustrates an example of a display operation performed by the display device 1 (the display unit 20). This display operation is an operation that is performed by the CPU 206 executing a program stored in the ROM 203. Further, this display operation is started when display data representing display information such as characters or an image that is displayed on the display 207 is stored in the RAM 202.

As illustrated in FIG. 3, when this operation is started, first, the CPU 206 determines whether display data stored in the RAM 202 has been updated (S101). However, when the determination of S101 performed at this point is the determination of S101 which is performed for the first time since this operation was started, a result of the determination is YES and the processing proceeds.

When the result of the determination of S101 is YES, the CPU 206 sets a first set value to be a display brightness of the display 207, and displays, on the display 207, the display information represented by the display data stored in the RAM 202 (S102). Accordingly, the display information represented by the display data is displayed on the display 207 with a display brightness of the first set value (an example of the first display characteristic). For example, the first set value is a value for a display brightness at which display information is easily visually confirmed by a user.

After S102, as described later in detail with reference to FIGS. 4 and 5, the CPU 206 performs processing of determining a limit value of a timer (hereinafter referred to as a "timer limit value") of the CPU 206, on the basis of an information amount of the display information represented by the display data stored in the RAM 202 (timer limit value determination processing) (S103). The timer limit value determined here is a value that corresponds to a period of time during which the display 207 displays, with a display brightness of the first set value, the display information represented by the display data stored in the RAM 202.

After S103, the CPU 206 sets the timer limit value determined in S103, and initializes (resets and starts) the timer (S104).

After S104 or when the result of the determination of S101 is NO, the CPU 206 determines whether a value of the timer reaches the timer limit value (S105).

When a result of the determination of S105 is NO, the process returns to S101.

On the other hand, when the result of the determination of S105 is YES, the CPU 206 sets a second set value to be the display brightness of the display 207 (S106). Accordingly, the display information that was displayed at a display brightness of the first set value is displayed on the display 207 with a display brightness of the second set value (an example of the second display characteristic). The second set value is a value that makes the display brightness lower than the case of the first set value. For example, the second set value is a value for a display brightness at which display information is less likely to obstruct the field of view of a user.

After S106, the CPU 206 determines whether the display is to be terminated (S107).

When a result of the determination of S107 is NO, the process returns to S101.

On the other hand, when the result of the determination of S107 is YES, this operation is terminated.

In the display operation illustrated in FIG. 3, when the result of determination of S101 is YES, the processes of S102 to S104 are performed in order of S102, S103, and S104, but the processing order is not limited to this. For example, the processes of S102 to S104 may be performed in order of S103, S102, and S104. In this case, for example, the processes of S102 to S104 may be performed in order of S102, S103, and S104 as illustrated in FIG. 3 when the CPU 206 has a high throughput, and the processes of S102 to S104 may be performed in order of S103, S102, and S104 when the CPU 206 does not have a high throughput (has a low throughput). Accordingly, a time difference between a termination time of S102 (a time when the display 207 starts displaying display information with a display brightness of the first set value) and a termination time of S104 (a time when the timer starts) can be made negligibly small.

In the display operation illustrated in FIG. 3, for example, in the determination of S107, the display may be determined to be terminated when a predetermined period of time has elapsed since the process of S102 was performed (since the display 207 started displaying display information with a display brightness of the first set value), and the display may be determined to not be terminated when the predetermined period of time has not elapsed. However, here, the predetermined period of time is longer than a period of time corresponding to the timer limit value.

Further, for example, in the determination of S107, the display may be determined to be terminated when a predetermined period of time has elapsed since the process of S106 was performed (since the display 207 started displaying display information with a display brightness of the second set value), and the display may be determined to not be terminated when the predetermined period of time has not elapsed. In this case, the predetermined period of time may be changed according to the timer limit value.

Furthermore, for example, in the determination of S107, the display may be determined to be terminated when an instruction to power off the display device 1 is issued by the manipulation button 30 being manipulated by a user, and the display may be determined to not be terminated when the instruction is not issued.

FIG. 4 is a flowchart that illustrates an example of the timer limit value determination processing (S103) performed when display information represented by display data is text (characters).

As illustrated in FIG. 4, in this processing, first, the CPU 206 counts the number of characters in the text represented by display data stored in the RAM 202 (S201).

Next, the CPU 206 determines whether the number of characters counted in S201 is greater than a threshold (for example, 20 characters) (S202).

When a result of the determination of S202 is YES, the CPU 206 determines a first set value (for example, a value corresponding to 10 seconds) to be the timer limit value (S203).

On the other hand, when the result of the determination of S202 is NO, the CPU 206 determines a second set value (for example, a value corresponding to two seconds) to be the timer limit value (S204).

The timer limit value of the second set value determined in S204 is smaller than the timer limit value of the first set value determined in S203.

When the process of S203 or S204 is completed, the processing is terminated (returns to the flowchart illustrated in FIG. 3).

FIG. 5 is a flowchart that illustrates an example of the timer limit value determination processing (S103) performed when the display information represented by the display data is an image.

As illustrated in FIG. 5, in this processing, first, the CPU 206 JPEG (joint photographic experts group) encodes image data that is the display data stored in the RAM 202 and obtains its amount of encoding (S301).

Next, the CPU 206 determines whether the amount of encoding obtained in S301 is greater than a threshold (for example, 80 kilobytes) (S302).

When a result of the determination of S302 is YES, the CPU 206 determines a first set value (for example, a value corresponding to 10 seconds) to be the timer limit value (S303).

On the other hand, when the result of the determination of S302 is NO, the CPU 206 determines a second set value (for example, a value corresponding to two seconds) to be the timer limit value (S304).

The timer limit value of the second set value determined in S304 is smaller than the timer limit value of the first set value determined in S303.

When the process of S303 or S304 is completed, the processing is terminated (returns to the flowchart illustrated in FIG. 3).

According to the display operations described with reference to FIGS. 3 to 5, for example, the display operations illustrated in FIGS. 6, 7, 8, and 9 are performed.

Figure 6:
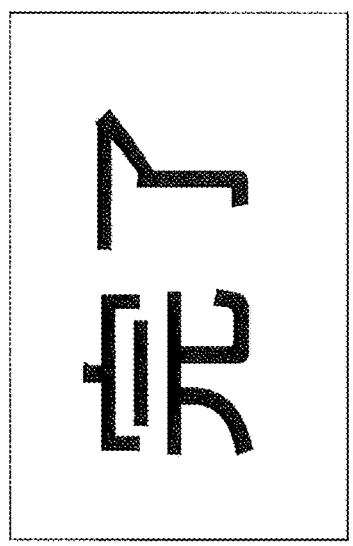
FIG. 6 is a first diagram that illustrates an example of the display operation when the display information represented by the display data is text.
Figure 6:
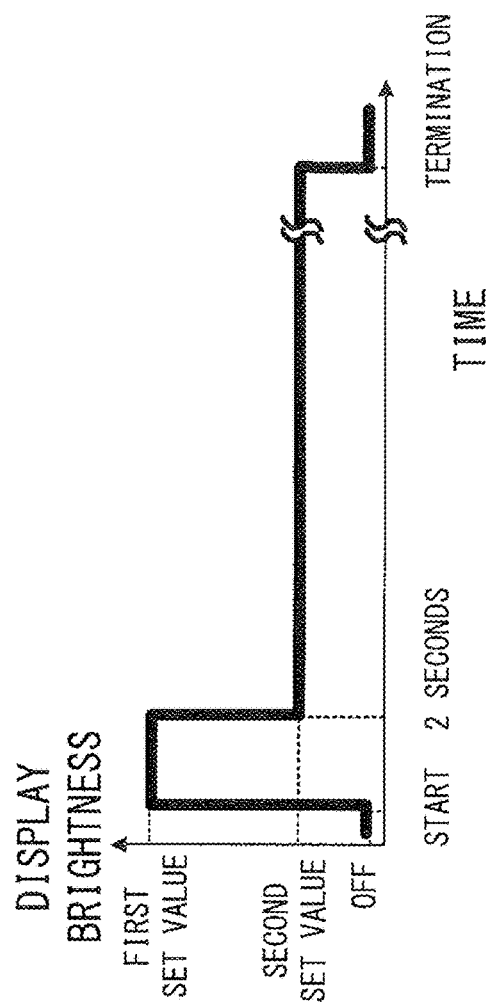
Figure 7:
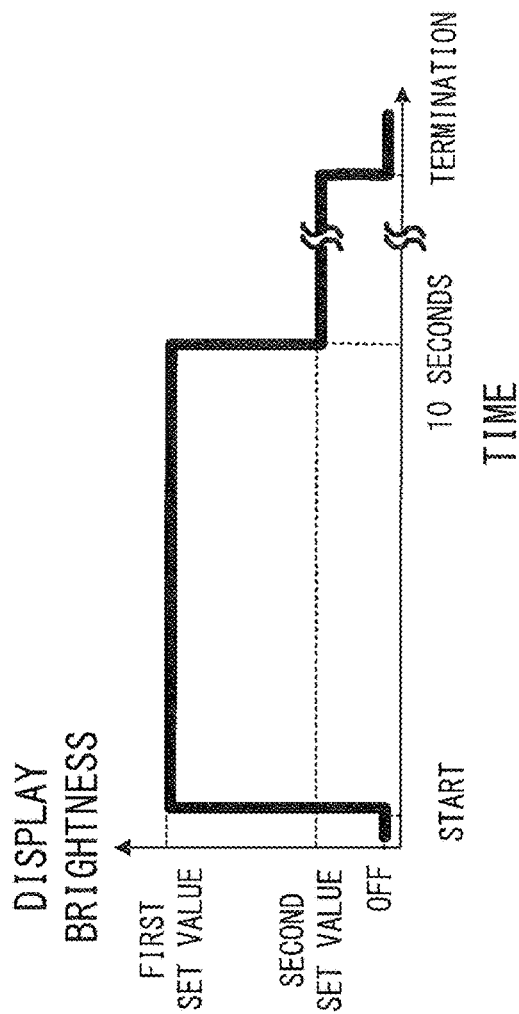
FIG. 7 is a second diagram that illustrates an example of the display operation when the display information represented by the display data is text.

FIGS. 6 and 7 illustrate examples of the display operation when the display information represented by the display data is text. Specifically, FIG. 6 illustrates an example of the display operation when the number of characters in the text is small, and FIG. 7 illustrates an example of the display operation when the number of characters in the text is large.

In both of FIGS. 6 and 7, text displayed on the display 207 is illustrated on the left side, and a graph that indicates how the display brightness of the display 207 is changed from the display being started to the display being terminated is illustrated on the right side. Further, in the example illustrated in FIGS. 6 and 7, 20 characters is set to be a threshold for the number of characters, a value corresponding to ten seconds is set to be a first set value for the timer limit value, and a value corresponding to two seconds is set to be a second set value for the timer limit value.

The example illustrated in FIG. 6 is an example in which the text represented by the display data is "完了" and its number of characters is two. In this case, the number of characters (2 characters) is not greater than the threshold (20 characters), so a second set value (a value corresponding to 2 seconds) is determined to be the timer limit value by the timer limit value determination processing illustrated in FIG. 4. Accordingly, the text "完了" is displayed on the display 207 with a display brightness of the first set value for two seconds from the display being started and is then displayed on the display 207 with a display brightness of the second set value until the display is terminated. In other words, the text is displayed for two seconds from the display being started with a display brightness at which the displayed text is easily visually confirmed by a user, and is then displayed until the display is terminated with a display brightness at which the displayed text is less likely to obstruct the field of view of the user.

The example illustrated in FIG. 7 is an example in which the text represented by the display data is "吾輩は猫である。名前はまだ無い。どこで生れたかとんと見当がつかぬ。何でも薄暗いじめじめした" and its number of characters is 45. In this case, the number of characters (45 characters) is greater than the threshold (20 characters), so a first set value (a value corresponding to 10 seconds) is determined to be the timer limit value by the timer limit value determination processing illustrated in FIG. 4. Accordingly, the text "吾輩は猫である。名前はまだ無い。どこで生れた かとんと見当 がつかぬ。何でも薄暗い じめじめした" is displayed on the display 207 with a display brightness of the first set value for ten seconds from the display being started and is then displayed on the display 207 with a display brightness of the second set value until the display is terminated. In other words, the text is displayed for ten seconds from the display being started with a display brightness at which the displayed text is easily visually confirmed by a user, and is then displayed until the display is terminated with a display brightness at which the displayed text is less likely to obstruct the field of view of the user.

Figure 8:
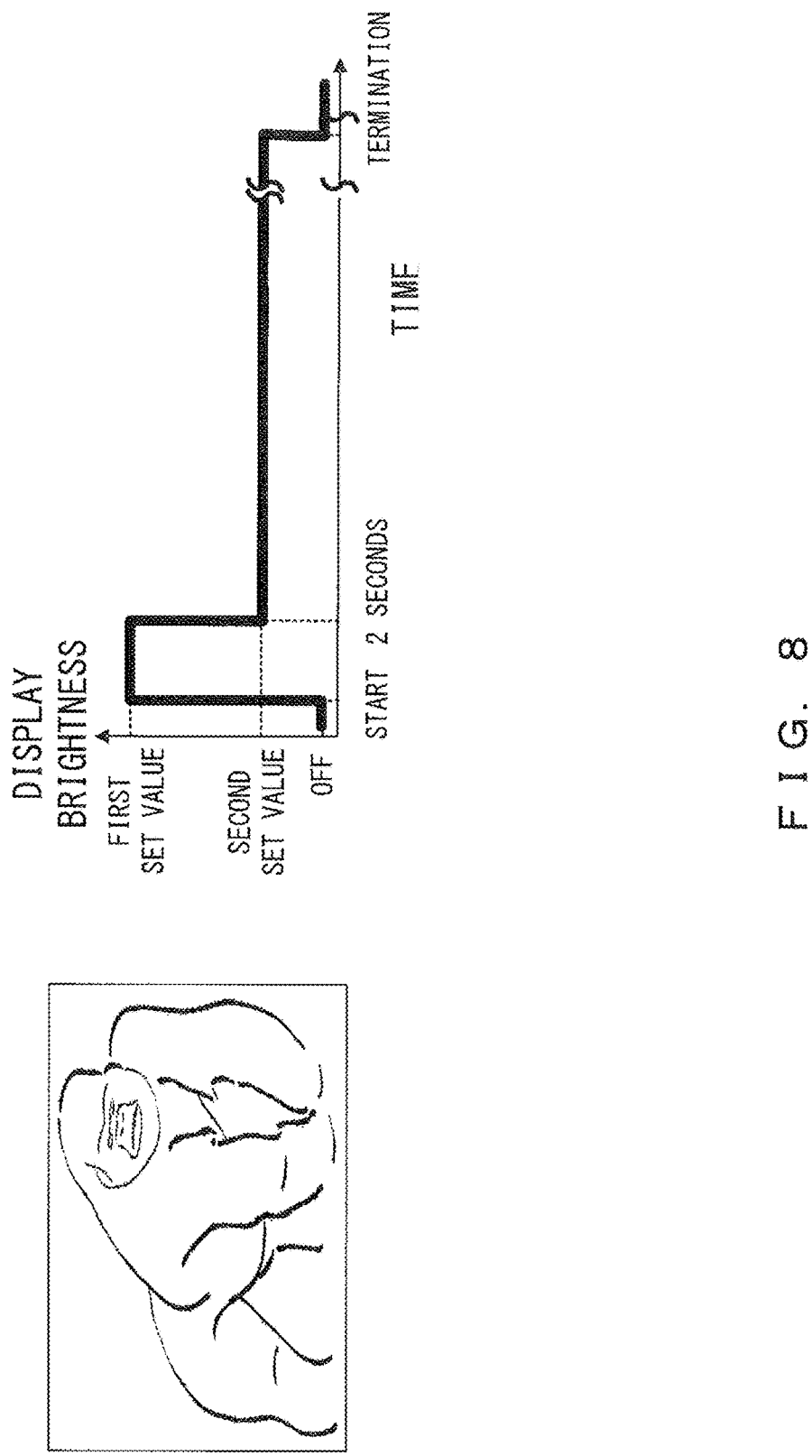
FIG. 8 is a first diagram that illustrates an example of the display operation when the display information represented by the display data is an image.
Figure 9:
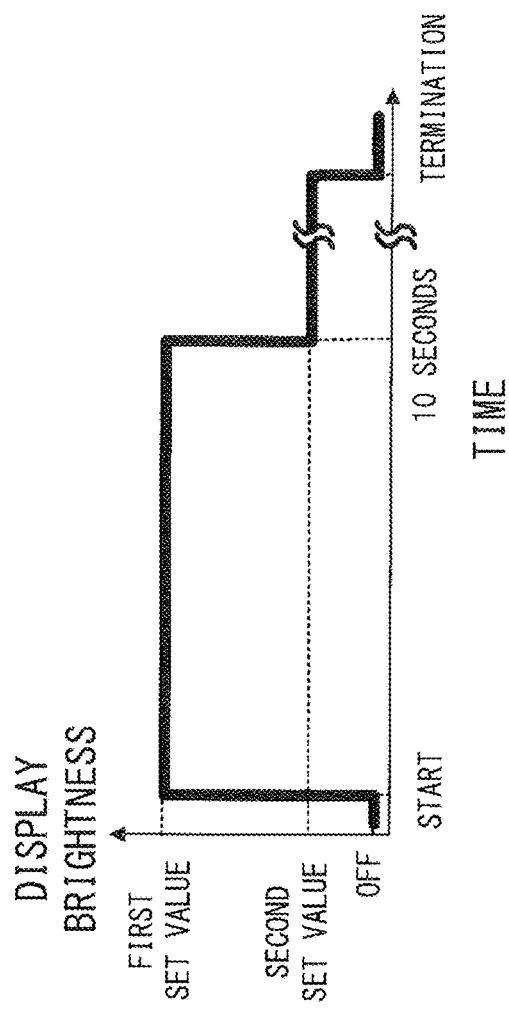
FIG. 9 is a second diagram that illustrates an example of the display operation when the display information represented by the display data is an image.
Figure 9:
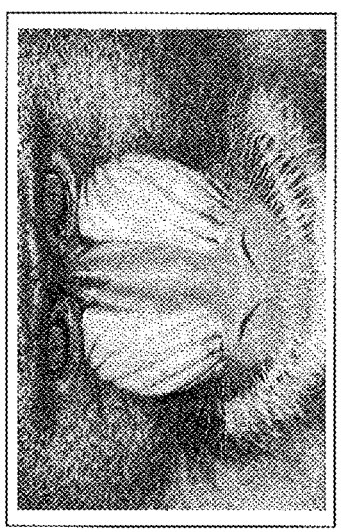

FIGS. 8 and 9 illustrate examples of the display operation when the display information represented by the display data is an image. Specifically, FIG. 8 illustrates an example of the display operation performed when an amount of encoding when the display data (image data) that represents the image is JPEG encoded is small, and FIG. 9 illustrates an example of the display operation performed when the amount of encoding is large.

In both of FIGS. 8 and 9, an image displayed on the display 207 is illustrated on the left side, and a graph that indicates how the display brightness of the display 207 is changed from the display being started to the display being terminated is displayed on the right side. Further, in the example illustrated in FIGS. 8 and 9, 80 kilobytes is set to be a threshold for an amount of encoding, a value corresponding to ten seconds is set to be a first set value for the timer limit value, and a value corresponding to two seconds is set to be a second set value for the timer limit value.

The example illustrated in FIG. 8 is an example in which an amount of encoding is not greater than the threshold (80 kilobytes) when the display data (image data) that represents the image is JPEG encoded. In this case, a second set value (a value corresponding to 2 seconds) is determined to be the timer limit value by the timer limit value determination processing illustrated in FIG. 5. Accordingly, the image represented by the display data (image data) is displayed on the display 207 with a display brightness of the first set value for two seconds from the display being started and is then displayed on the display 207 with a display brightness of the second set value until the display is terminated. In other words, the image is displayed for two seconds from the display being started with a display brightness at which the displayed image is easily visually confirmed by a user, and is then displayed until the display is terminated with a display brightness at which the displayed image is less likely to obstruct the field of view of the user.

The example illustrated in FIG. 9 is an example in which an amount of encoding is greater than the threshold (80 kilobytes) when the display data (image data) that represents the image is JPEG encoded. In this case, a first set value (a value corresponding to 10 seconds) is determined to be the timer limit value by the timer limit value determination processing illustrated in FIG. 5. Accordingly, the image represented by the display data (image data) is displayed on the display 207 with a display brightness of the first set value for ten seconds from the display being started and is then displayed on the display 207 with a display brightness of the second set value until the display is terminated. In other words, the image is displayed for ten seconds from the display being started with a display brightness at which the displayed image is easily visually confirmed by a user, and is then displayed until the display is terminated with a display brightness at which the displayed image is less likely to obstruct the field of view of the user.

As described above, when display information represented by display data is display information, such as the text illustrated in FIG. 6 or the image illustrated in FIG. 8, that has a small amount of information for which the period of time needed for a user to visually confirm and understand the display information is short, a period of time during which the display information is displayed at a display brightness of a first set value (which is a period of time during which the display information is displayed at a display brightness at which the display information is easily visually confirmed by the user) is short. Thus, the display information is not continuously viewed by the user after the user visually confirms and checks the display information, so the user will not be annoyed by the display information.

Conversely, when display information represented by display data is display information, such as the text illustrated in FIG. 7 or the image illustrated in FIG. 9, that has a large amount of information for which the period of time needed for a user to visually confirm and understand the display information is long, a period of time during which the display information is displayed at a display brightness of the first set value is long. Thus, the information display is not terminated before the user visually confirms and checks the display information sufficiently, so the user will be able to visually confirm and check the display information sufficiently.

As described above, according to the present embodiment, it is possible to perform an information display suitable for displayed information.

The following modification may also be made to the present embodiment.

For example, with respect to the timer limit value determination processing described with reference to FIGS. 4 and 5, the example in which one of the two different set values (the first set value and the second set value) is determined to be the timer limit value on the basis of an information amount (the number of characters or an amount of encoding) of display information represented by display data has been described, but one of three or more different set values may be determined to be the timer limit value. Alternatively, the timer limit value may be obtained (determined) by performing an operation on the basis of an information amount of display information represented by display data.

Further, for example, with respect to the display operation described with reference to FIG. 3, the example in which a display brightness is changed has been described as an example in which a display characteristic of display information displayed on the display 207 is changed, but a display color, a display contrast, or a display position may be changed instead of the display brightness.

When a display color is changed, the CPU 206 displays, on the display 207, display information represented by display data with a first display color in S102 of FIG. 3, and displays, on the display 207, the display information represented by the display data with a second display color in S106 of FIG. 3. Here, the first display color is, for example, a display color with which the display information is easily visually confirmed by a user, and the second display color is, for example, a display color with which the display information is less likely to obstruct the field of view of the user.

When a display contrast is changed, the CPU 206 displays, on the display 207, display information represented by display data with a first display contrast in S102 of FIG. 3, and displays, on the display 207, the display information represented by the display data with a second display contrast in S106 of FIG. 3. Here, the first display contrast is, for example, a display contrast at which the display information is easily visually confirmed by a user, and the second display contrast is, for example, a display contrast at which the display information is less likely to obstruct the field of view of the user.

When a display position is changed, the CPU 206 displays display information represented by display data at a first display position on the display 207 in S102 of FIG. 3, and displays the display information represented by the display data at a second display position on the display 207 in S106 of FIG. 3. Here, the first display position is, for example, a display position at which the display information is easily visually confirmed by a user, and the second display position is, for example, a display position at which the display information is less likely to obstruct the field of view of the user.

Further, for example, in the display operation described with reference to FIG. 3, the example in which a timer limit value that determines a timing at which a display characteristic is changed is determined on the basis of an information amount of display information represented by display data has been described, but the timer limit value may be determined on the basis of an information type of the display information represented by the display data. In this case, type data that represents the information type of the display information represented by the display data is attached to the display data, and the CPU 206 determines the timer limit value on the basis of the information type represented by the type data in S103 of FIG. 3. Here, the information type represented by the type data is, for example, "warning", "caution", or "information". "Warning" indicates that the information warns a user. "Caution" indicates that the information cautions the user. "Information" indicates that the information is other than "warning" or "caution". In this case, the timer limit value determined on the basis of the information type "warning" is greater than the timer limit value determined on the basis of the information type "caution". Further, the timer limit value determined on the basis of the information type "caution" is greater than the timer limit value determined on the basis of the information type "information".

Figure 10:
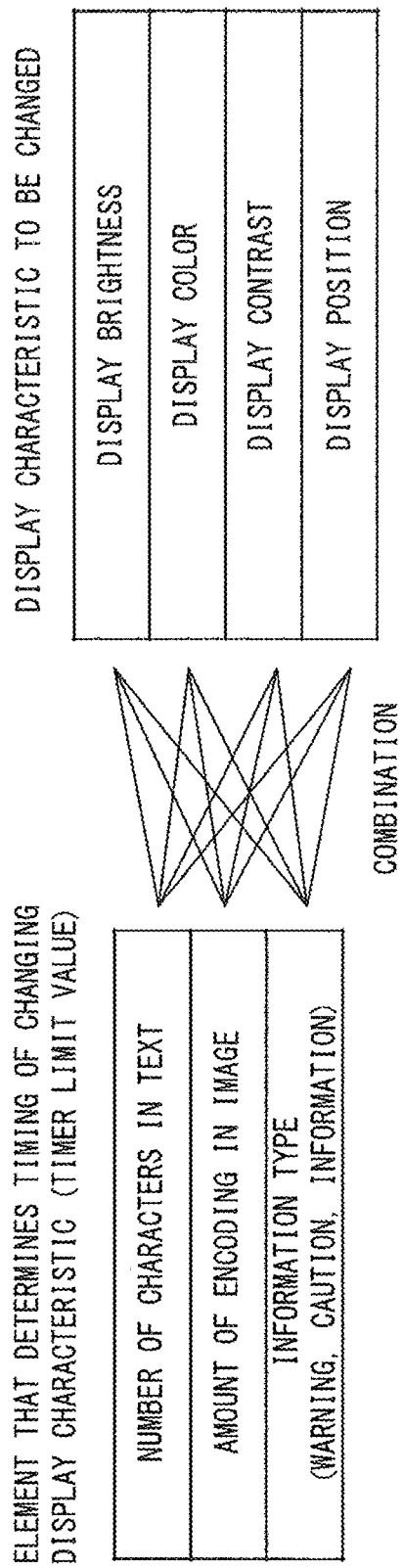
FIG. 10 illustrates an example of a combination of a display characteristic to be changed and an element that determines a timing (timer limit value) at which the display characteristic is changed.

Furthermore, in the display operations described above, a combination of a display characteristic to be changed and an element that determines a timing at which the display characteristic is changed (timer limit value) is not limited to the combinations described above, but the combination is selected from, for example, combinations illustrated in FIG. 10 to be used. In this case, one display characteristic may be combined with one determination element, or a plurality of display characteristics may be combined with one determination element. For example, as the former case, "display color" may be combined with "information type (warning, caution, information)", or as the latter case, "display brightness" and "display color" may be combined with "information type (warning, caution, information)". In the case of the latter combination, both the display brightness and the display color are changed at a timing determined on the basis of the information type of display information represented by display data.

The embodiments described above are just examples to facilitate understanding of the present invention, and the invention is not limited to these embodiments. Various modifications and alterations may be made hereto without departing from the spirit of the invention specified in the claims.

What is claimed is:

1. A display device comprising:
a display unit that displays input display information;
a determination unit that determines, on the basis of the display information, a period of time during which the display unit displays the display information with a first display characteristic; and
a controller that controls the display unit to display the display information with the first display characteristic and to display the display information with a second display characteristic when the period of time has elapsed since the display with the first display characteristic was started,
wherein the display information upon which the period of time is determined is at least one of (A) a number of characters in text of the display information, or (B) an amount of encoding of an image of the display information Wherein when the display information represented by display data is text, the controller counts the number of characters in the text represented by display data stored in a memory and then determines whether the number of characters counted is greater than a threshold; and when the display information represented by the display data is an image, the controller encodes the display data stored in the memory and obtains its amount of encoding, and then the controller determines whether the amount of encoding obtained in is greater than a threshold.

2. The display device according to claim 1, wherein the first display characteristic and the second display characteristic each include one or more characteristics that are a display brightness, a display color, a display contrast, and a display position.

3. The display device according to claim 1, wherein the determination unit determines the period of time on the basis of an information amount or an information type of the display information.

4. The display device according to claim 1, wherein the display unit is a see-through type display.

5. The display device of claim 4, wherein the first display characteristic makes the display information more easily visually confirmed than the second display characteristic.

6. The display device of claim 4, wherein the second display characteristic is less likely to obstruct the field of view of a user using the display than the first display characteristic.

7. The display device according to claim 1, wherein the display unit is a see-through type, head-mounted display.

8. A method for controlling how input display information is displayed on a display device, the method comprising:

determining, on the basis of the display information, a timer limit value;
starting a timer;
determining whether or not a value of the timer exceeds the timer limit value;
responsive to a determination that the value of the timer does not exceed the timer limit value, displaying the display information with a first display characteristic, and otherwise, responsive to a determination that the value of the timer exceeds the timer limit value, displaying the display information with a second display characteristic which is different from the first display characteristic,
wherein the display information upon which the timer limit value is determined is at least one of (A) a number of characters in text of the display information, or (B) an amount of encoding of an image of the display information Wherein when the display information represented by display data is text, the controller counts the number of characters in the text represented by display data stored in a memory and then determines whether the number of characters counted is greater than a threshold; and when the display information represented by the display data is an image the controller encodes the display data stored in the memory and obtains its amount of encoding, and then the controller determines whether the amount of encoding obtained in is greater than a threshold.

9. The method of claim 8, wherein the display device is a see-through type display.

10. The method of claim 9, wherein the first display characteristic makes the display information more easily visually confirmed than the second display characteristic.

11. The method of claim 9, wherein the second display characteristic is less likely to obstruct the field of view of a user using the display device than the first display characteristic.

12. The method of claim 8, wherein the display device is a see-through type, head-mounted display.

13. A non-transitory computer-readable recording medium storing a program for causing a computer of a display device to perform a process comprising:

determining, on the basis of display information, a timer limit value;
starting a timer;
determining whether or not a value of the timer exceeds the timer limit value;
responsive to a determination that the value of the timer does not exceed the timer limit value, displaying the display information with a first display characteristic, and otherwise, responsive to a determination that the value of the timer exceeds the timer limit value, displaying the display information with a second display characteristic which is different from the first display characteristic,
wherein the display information upon which the timer limit value is determined is at least one of (A) a number of characters in text of the display information, or (B) an amount of encoding of an image of the display information Wherein when the display information represented by display data is text, the controller counts the number of characters in the text represented by display data stored in a memory and then determines whether the number of characters counted is greater than a threshold; and when the display information represented by the display data is an image the controller encodes the display data stored in the memory and obtains its amount of encoding, and then the controller determines whether the amount of encoding obtained in is greater than a threshold.

14. The non-transitory computer-readable recording medium of claim 13, wherein the display device is a see-through type display.

15. The non-transitory computer-readable recording medium of claim 14, wherein the first display characteristic makes the display information more easily visually confirmed than the second display characteristic.

16. The non-transitory computer-readable recording medium of claim 14, wherein the second display characteristic is less likely to obstruct the field of view of a user using the display device than the first display characteristic.

17. The non-transitory computer-readable recording medium of claim 13, wherein the display device is a see-through type, head-mounted display.

* * * * *